United States Patent Office 3,389,183
Patented June 18, 1968

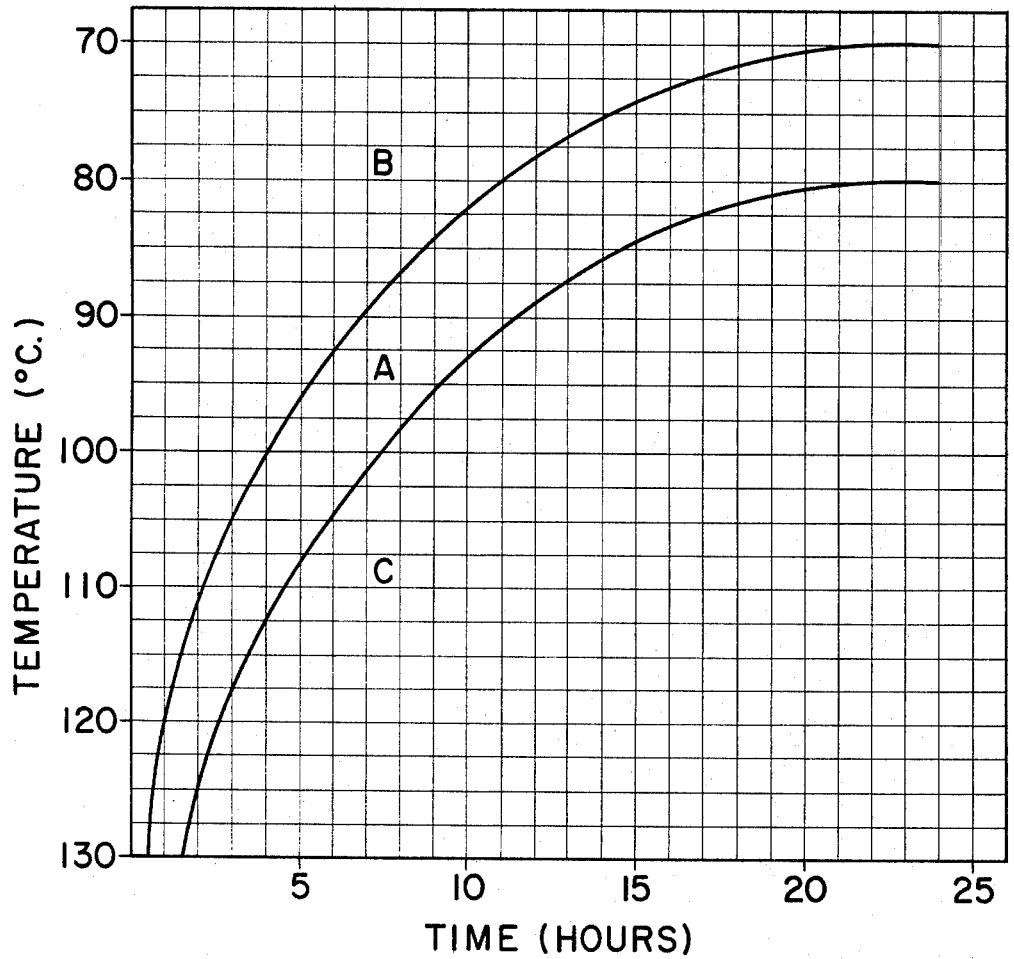

3,389,183
PROCESS FOR THE PREPARATION OF TERTIARY PHOSPHINES
Hugh R. Hays, Colerain Township, Hamilton County, Ohio, assignor to The Procter & Gamble Company, Cincinnati, Ohio, a corporation of Ohio
Filed June 7, 1965, Ser. No. 461,669
17 Claims. (Cl. 260—606.5)

ABSTRACT OF THE DISCLOSURE

Production of detergent intermediate tertiary phosphine by (1) controlled alkylation of long chain primary phosphine in the presence of an alcohol solvent, and (2) reaction of the trialiphatic phosphonium salt formed in the controlled alkylation step with a strong base. For example, dodecyldimethylphosphine is prepared by reacting dodecylphosphine with methyl chloride at 125° C. for 1.5 hours and then reacting with sodium hydroxide.

---

This invention relates to a process for the production of tertiary phosphines. It relates especially to a process for the production of tertiary phosphines which are valuable intermediates in the preparation of the corresponding tertiary phosphine oxides. These phosphine oxides have utility as detergents and detergent supplements such as foam stabilizers and are described in South African Patent 62/810, granted Dec. 19, 1962, and in British Patent 976,974, published Dec. 2, 1964.

A comprehensive review of the art-recognized methods for the preparation of tertiary phosphines is presented in Kosolapoff, Organophosphorus Compounds (1950), at pages 10–22. However, none of these methods is entirely satisfactory from an economic standpoint. In many cases, the starting materials are ordinarily presently rather expensive. Often, expensive catalysts are necessary or reaction conditions are difficult to obtain and/or maintain. Many of these methods result in hard-to-separate by-products. In addition, many of these methods result in less than 50% yields. Thus, a novel method for the preparation of these tertiary phosphines is desirable since such a method provides added flexibility and therefore possible economic savings.

Thus, it is an object of this invention to provide a novel process for the preparation of these tertiary phosphines.

It is a further object of this invention to provide a commercially feasible process for preparing these tertiary phosphines from certain long chain primary phosphines.

It is a further object of this invention to provide a process for the preparation of these tertiary phosphines wherein the by-products are easily separated to produce a substantially pure product.

Another object of this invention is to provide a process for the preparation of these tertiary phosphines in high, that is, 70% to 95%, yields. (Yield figures herein are based on the long chain primary phosphine and are in terms of actual recovery of product.)

These and other objects will be apparent after referring to the following specification and drawing, the details of which are hereinafter more fully described.

FIGURE 1 is a plot of time in hours vs. temperature in degrees C. and defines a range of reaction conditions for one of the reactants for use herein, as more fully described hereinafter.

The above objects are realized in the present invention by a process comprising an alkylation step to form trialiphatic phosphonium salt and a second reaction step to form tertiary phosphine.

In the alkylation step a long chain primary phosphine is reacted with an alkyl halide in the presence of an alcohol reaction solvent under reaction conditions which result in formation of trialiphatic phosphonium salt but do not cause any appreciable, that is, not more than about 15%, dissociation of the trialiphatic phosphonium salt and further alkylation of dissociation product to tetraaliphatic phosphonium salt.

The long chain primary phosphines to be reacted within the scope of this invention have the formula $RPH_2$, wherein R is an aliphatic radical and especially an alkyl or alkenyl radical containing from 10 to 18 carbon atoms. The term "alkyl" is used herein to include only saturated carbon chains. The term "alkenyl" is used herein to include carbon chains containing one or more double bonds.

Long chain primary phosphines for use herein include, for example, decylphosphine, dodecylphosphine, tetradecylphosphine, cetylphosphine, palmitoleylphosphine, oleylphosphine and stearylphosphine.

The alkyl halides which are reacted within the scope of this invention and which are utilized herein as alkylating agents have the formula $R'X$ wherein $R'$ is a lower alkyl radical containing from 1 to 4 carbon atoms and X is a halide selected from the group consisting of Cl, Br and I. Alkyl halides for use herein include, for example, methyl chloride, ethyl chloride, propyl chloride, butyl chloride, methyl bromide, ethyl bromide, propyl bromide, butyl bromide, methyl iodide, ethyl iodide, propyl iodide and butyl iodide.

The alcohol reaction solvent has the formula $R'OH$ wherein $R'$ is defined as above. Preferably, the $R'$ of the alcohol reaction solvent used corresponds to the $R'$ of the alkylating agent used. Thus, methyl alcohol is preferably used as the reaction solvent with methyl chloride, methyl bromide and methyl iodide alkylating agents. In like manner, ethyl alcohol is preferably used as the reaction solvent with ethyl chloride, ethyl bromide and ethyl iodide alkylating agents. In similar fashion, propyl alcohol is preferably used with alkylating agents where $R'$ is a propyl group and butyl alcohol is preferably used with alkylating agents wherein $R'$ is a butyl group. If $R'$ of the alcohol reaction solvent does not correspond to $R'$ of the alkylating agent, the alcohol can be converted during reaction to its corresponding alkyl halide and this alkyl halide can react with long chain primary phosphine to form small amounts, that is, 5% to 10%, of product containing the $R'$ of the alcohol to provide a product mixture.

As previously stated, the reaction conditions of the alkylation step must result in formation of trialiphatic phosphonium salt but must not cause any appreciable dissociation of the trialiphatic phosphonium salt and further alkylation of dissociation product to tetraaliphatic phosphonium salt. These conditions are described below. This reaction conditions limitation is best understood with reference to the following equation which shows the complete alkylation sequence of the reaction of long chain primary phosphine and alkyl halide. In the following equation R, R' and X are defined as above, the above described reaction solvent is utilized and reaction conditions are not specified:

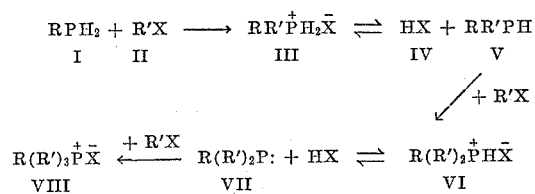

In this equation long chain primary phosphine (I) is reacted with alkyl halide (II) to form first of all dialiphatic phosphonium salt (III). Depending on the reaction conditions, this salt can dissociate to hydrogen halide (IV) and secondary phosphine (V) which can be further alkylated by the alkyl halide reactant. Further alkylation of (V) produces the desired trialiphatic phosphonium salt (VI). Depending on the reaction conditions, this salt can dissociate to hydrogen halide and tertiary phosphine (VIII), which is immediately and irreversibly alkylated to the tetraaliphatic phosphonium salt (VIII). In the alkylation step of this invention, the reaction conditions must result in the formation of (VI), the desired product in this step. If, for example, the reaction conditions are such that (V) as well as (VI) results, not only is the yield of (VI) decreased, but also the (V) is separated from the ultimate tertiary phosphine product with difficulty. The reaction conditions should not, however, cause any appreciable dissociation of the formed (VI) to (VII) thereby causing the formation of (VIII) since such dissociation decreases the yield of ultimate tertiary phosphine product. It is noted, however, that (VIII) is unaffected by the second reaction step of the present process and is therefore easily separated from the ultimate tertiary phosphine product since it is soluble in the alcohol reaction solvent while the tertiary phosphine is not. It is further noted that (VIII) can be easily and desirably converted to its corresponding phosphine oxide by a method disclosed in applicant's copending application, Ser. No. 329,251, filed Dec. 9, 1963, now Patent No. 3,325,546.

The reaction conditions that are varied in the alkylation step of this invention in order to produce the desired trialiphatic phosphonium salt product depend upon the specific alkyl halide used as the alkylating agent. Thus, when alkyl chlorides, such as methyl chloride, are used herein as alkylating agents, the by-product acid concentration is a reaction variable and from 1 to 4 and preferably 2 equivalents, based on the long chain primary phosphine reactant, of hydrogen chloride should be added to the reactants in order to suppress dissociation of the desired trialiphatic phosphonium chloride. In the case of alkylating agents other than alkyl chlorides, acid need not be added to the reactants to suppress such dissociation.

When alkylating agents are used herein which are gases at room temperature, the reaction system pressure is a variable to be considered. Thus, when methyl chloride, methyl bromide or ethyl chloride, each of which is a gas at room temperature, are used herein as alkylating agents, the alkylation reaction is carried out in a closed system at a pressure ranging from atmospheric to about 2000 p.s.i., preferably at a pressure ranging from about 300 p.s.i. to about 700 p.s.i. The pressures herein are the maximum pressures obtained at specified reaction temperature. It is not necessary to specify reaction system pressures for alkylating agents used herein other than methyl chloride, ethyl chloride and ethyl bromide since these alkylating agents are liquids at room temperature.

The reaction temperature and reaction time also depend upon the specific alkylating agent used. In general, reaction temperatures ranging from about 30° C. to about 130° C. and reaction times ranging from about 10 minutes to about 100 hours are utilized herein. If the reaction is conducted at atmospheric pressure the boiling points of the alkylating agent and reaction solvent are limitations upon this general reaction temperature range. For a given alkylating agent the higher the reaction temperature is, the shorter the reaction time utilized. Furthermore, for a given temperature and pressure and halogen portion of the alkylating agent, the greater the number of carbon atoms in the alkyl portion of the alkylating agent, the longer the reaction time must be for optimum reaction completeness.

In the case where methyl chloride is used as the alkylating agent and where no reaction catalyst is used, it has been found that for high, that is, 70% to 95%, yields of ultimate tertiary phosphine product, a time-temperature relationship within area A of the drawing must be used herein. Area A of the drawing is empirically determined based on high yields of ultimate product. If time-temperature relationships falling within area B of the drawing are used, there will be low yields of desired trialiphatic phosphonium salt and thus of tertiary phosphine because of incomplete alkylation. If time-temperature relationships falling within area C of the drawing are used, at least a substantial portion of the desired trialiphatic phosphonium salt reaction product dissociates, irreversibly forming tetraaliphatic phosphonium salt.

In the preferred alkylation reaction with methyl chloride as the alkylating agent, a reaction temperature of 125° C. is maintained for from about 0.75 to about 1.75 hours.

In the case where methyl chloride is used as the alkylating agent and from 2 to 4 and preferably 3 mole percent iodide ion, based on the long chain primary phosphine reactant, is added to the reactants initially as a catalyst, the reaction time is shortened by a factor of about three. Thus, where iodide ion is used as a reaction catalyst, the reaction times necessary according to area A of FIGURE 1 are divided by about three to provide the applicable reaction time at the chosen temperature. The iodide ion is added to the reactants in the form of a chemical compound which provides iodide ion when dissolved in the alcohol reaction solvent used. Suitable catalysts for use herein include, for example, sodium iodide, potassium iodide and alkyl iodides having the formula R'I wherein R' is defined as previously. Sodium iodide is the preferred catalyst.

Preferred time-temperature relationships for certain other alkylating agents are given in the following table:

| Alkylating Agent | Time (hours) | Temperature (° C.) |
|---|---|---|
| Methyl iodide | 4.25–5.25 | Reflux (42–65). |
| Ethyl iodide | 45–50 | Reflux (72–78). |
| Butyl iodide | 50–75 | 70–75. |

Turning now to the second reaction step of the process of the invention, in this step the reaction mixture resulting from the alkylation step is reacted with a basic compound to form the ultimate tertiary phosphine reaction product, a salt and water. Ordinarily, sufficient basic compound is added to react completely with the trialiphatic phosphonium salt, by-product acid and added acid, if any, components of the alkylation step post-reaction mixture. The reaction in this step is ordinarily carried out at a temperature ranging from −100° C. to 50° C.

The basic compound for use herein can be selected from a wide variety of bases. It need only be a rather strong base. Therefore, hydroxides, oxides and carbonates such as, for example, sodium hydroxide, potassium hydroxide, ammonium hydroxide, calcium hydroxide, sodium oxide, potassium oxide, sodium carbonate and potassium carbonate can all be used. These compounds can be added to the alkylation step post-reaction mixture in the pure form, for example as an anhydrous powder, or as a water solution. Of these compounds, sodium hydroxide is the preferred reactant because of its wide availability in many physical forms and because of its relative low cost.

The reaction of trialiphatic phosphonium salt with basic compound in this second reaction step is illustrated by the following example equation wherein sodium hydroxide is used as the basic compound:

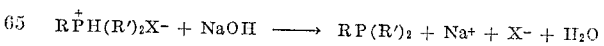

$$R\overset{+}{P}H(R')_2X^- + NaOH \longrightarrow RP(R')_2 + Na^+ + X^- + H_2O$$

In the above equation R, R' and X are defined as previously.

In this reaction step and also in the previous alkylation step, the reaction is necessarily carried out under argon, nitrogen or other inert gas so as to avoid oxidation of, or other undesired side reaction with, the resulting reaction products.

The reaction in this second reaction step produces a reaction mixture comprising two liquid layers, one of which contains the desired tertiary phosphine reaction product together with a small (2% to 5%) percentage of alcohol solvent. The other liquid layer contains the rest of the alcohol solvent, the salt formed in the second reaction step, any water present, and various other substances. The tertiary phosphine layer can be segregated, for instance, by decanting. Tertiary phosphine can be isolated at 100% purity from this layer simply by distillation.

Turning now to a general discussion of the reactants for use in the present process, only the long chain primary phosphines are not readily available commercially. These long chain primary phosphines can be made in a two-step reaction wherein long chain aliphatic halide is reacted with triethyl phosphite at 140–180° C. and the reaction product refluxed with lithium aluminum hydride in diethyl ether to product a reaction mixture containing long chain primary phosphine; the long chain primary phosphine is isolated by distillation of the ether phase under reduced pressure. This method for the preparation of long chain primary phosphine is given only by way of example and does not constitute any part of the present invention.

The following examples are illustrative of the present invention and are not to be construed in any way as limiting the scope of the invention. In these examples, there is no appreciable dissociation of the trialiphatic phosphonium salt which is formed in the alkylation step.

*Example 1.—Preparation of dodecyldimethylphosphine; methyl chloride as alkylating agent*

Dodecyl phosphine was prepared as follows: Four hundred grams (2.4 moles) of triethyl phosphite was added to 496 grams (2.0 moles) of dodecyl bromide. This reaction mixture was maintained at 170° C. for 12 hours. During this period ethyl bromide distilled out of the system as it was formed. This reaction produced 436 grams (1.43 moles) of diethyl dodecylphosphonate. Three hundred seventy-nine grams (1.24 moles) of this diethyl dodecylphosphonate was added dropwise with stirring to 68 grams (1.79 moles) of lithium aluminum hydride in three liters of diethyl ether. This addition was carried out at 0° C. and under argon. This reaction mixture was refluxed for 8 hours. At this point 1500 ml. of a 1:1 mixture of 37% hydrochloric acid and water was added dropwise to the reaction mixture, the temperature being maintained at 0° C. during hydrolysis. The mixture was then allowed to warm to room temperature. The ether phase was separated and water-washed three times with 100 ml. of water. Distillation at 2.0 mm. Hg pressure and 99–102° C. provided 201 grams of dodecyl phosphine.

A methanol-hydrogen chloride solution was then prepared as follows: Hydrogen chloride was introduced as a gas into methanol kept at tap water temperature to provide a saturated solution of hydrogen chloride in methanol. This solution titrated at 8.7 normal.

At this point a 150 ml. glass tube was flushed with argon and capped with a septum. Thirteen and one-half ml. of methanol was added to the tube through the septum via a syringe. The tube was then uncapped under argon and 11.5 ml. of the above 8.7 normal hydrogen chloride-methanol solution added. The tube now contained 0.625 mole methanol and 0.1 mole hydrogen chloride. The tube and its contents were cooled to −70° C.

To the tube and its contents, now at −70° C. and still under argon, were added 6.7 ml. (0.1 mole) of liquid methyl chloride via a Dry Ice cooled pipette. The tube was then recapped. To this methanol, methyl chloride, hydrogen chloride mixture was added via a syringe and through the septum 12.5 ml. (0.05 mole) of the above dodecyl phosphine. The tube was then sealed under argon with a torch.

The sealed tube was transferred to a steam heated autoclave and was maintained at 125° C. for about 1.5 hours. During this period the maximum pressure in the sealed tube calculated on the basis of ideal gas laws was about 640 p.s.i. The tube was then cooled to room temperature and opened with a torch under argon. To the opened tube were added 8 grams (0.2 mole) solid sodium hydroxide in powder form. This mixture still under argon was warmed slowly to room temperature and centrifuged. Centrifuging yielded three phases, an upper liquid phase, a lower liquid phase and a lower solid phase. The upper liquid phase was removed with a syringe. This phase was 98% pure dodecyldimethylphosphine, the other 2% being mostly methanol. This reaction produced an 80 to 90% yield of dodecyldimethylphosphine. The product can be distilled to provide 100% pure dodecyldimethylphosphine.

Yields and purity of product substantially equal to those obtained above are obtainable if equivalent amounts of other strong bases, such as potassium hydroxide, ammonium hydroxide, calcium hydroxide, sodium oxide, potassium oxide, sodium carbonate or potassium carbonate are substituted for the sodium hydroxide in this example.

*Example II.—Sodium iodide as catalyst*

Dodecyldimethylphosphine was prepared as in Example I except that 1.5 millimoles of sodium iodide were added to the reaction mixture immediately after the addition of the 12.5 ml. of dodecyl phosphine, the reaction tube sealed, and the sealed tube maintained at 120° C. for about 20 minutes.

Yields and purity of product were substantially equal to those obtained in Example I. High yields of substantially pure product are also obtained if the iodide ion in this example is supplied by potassium iodide or methyl iodide in place of sodium iodide.

*Example III.—Preparation of dodecyldimethylphosphine: methyl iodide as alkylating agent*

To a 500 ml. flask and under argon were added 101 grams (0.5 mole) dodecylphosphine, prepared as in Example I, 145 grams (1.02 moles) methyl iodide and 200 ml. of methanol. This mixture was refluxed (42–65° C.) for five hours. The excess methyl iodide formed from methanol was removed under vacuum without heat. The resulting methanol solution still under argon was adjusted to room temperature and 80 grams (2.0 moles) of powdered sodium hydroxide added. After reaction two liquid layers existed, the upper layer containing nearly pure dimethyldodecylphosphine together with about 2% by weight methanol. After the lower layer was removed via a syringe, the upper layer was distilled through a 24 inch spinning ban column and the fraction having a boiling point of 80° to 83° C. at 0.03 mm. Hg isolated. This fraction was 100% pure dodecyldimethylphosphine according to gas chromotographic analysis. A yield of 90% was achieved.

*Example IV.—Preparation of decyldimethylphosphine; methyl iodide as alkylating agent*

Decyl phosphine was prepared according to the procedure for preparing dodecyl phosphine in Example I except that an equivalent amount of decyl bromide was used instead of the dodecyl bromide utilized in Example I.

Decyldimethylphosphine was then prepared by the procedure for preparing dodecyldimethylphosphine in Example III except that an equivalent amount of decyl phosphine was used for the dodecyl phosphine of Example III. The upper layer existing after reaction was distilled through a 24 inch spinning band column and the fraction having a boiling point of 85° C. at 0.4 to 0.5 mm. Hg isolated. This fraction was 99.9% pure decyldimethylphosphine. A 92% yield was achieved.

In like manner, high yields of substantially pure cetyldimethylphosphine and palmitoleyldimethylphosphine are obtainable if equivalent amounts of cetyl phosphine and palmitoleyl phosphine are used respectively for the decyl phosphine above or for the dodecyl phosphine of Example III.

*Example V.—Preparation of dodecyldibutylphosphine; butyl iodide as alkylating agent*

To a 1000 ml. flask and under argon were added 101 grams (0.5 mole) dodecyl phosphine, prepared as in Example I, 188 grams (1.02 moles) butyl iodide ($n$) and 450 ml. of butanol ($n$). This mixture was maintained at 70° to 75° C. for 64 hours. The excess butyl iodide formed from butanol was removed under vacuum without heat. The resulting butanol solution still under argon was adjusted to room temperature and 160 grams of 50% aqueous sodium hydroxide added. After reaction two layers existed. The aqueous layer was removed via syringe and the remaining layer was distilled through a 24 inch spinning band column. The distillation fraction having a boiling point of 135° to 145° C. at 0.5 mm. Hg was isolated. This fraction was 99.9% pure dodecyldibutylphosphine. A 78% yield was achieved.

*Example VI.—Preparation of dodecyldiethylphosphine; ethyl iodide as alkylating agent*

To a 200 ml. flask and under argon were added 20.2 grams (0.1 mole) dodecyl phosphine, prepared as in Example I, 46.8 grams (0.3 mole) ethyl iodide and 50 ml. of ethanol. This mixture was refluxed (72–78° C.) for 48 hours. The ethyl iodide present after reaction was removed under vacuum without heat. The resulting ethanol solution still under argon was adjusted to room temperature and 16 grams of sodium hydroxide in powder form added. The lower (ethanol) layer existing after reaction was removed via syringe; the upper layer was distilled and the fraction having a boiling point ranging from 117° to 135° C. at 0.6 mm. Hg was isolated. This fraction was 90% pure diethyldodecylphosphine. An 80% yield was achieved.

High yields of substantially pure dodecyldiethylphosphine can also be obtained if equivalent amounts of ethyl bromide are substituted for the ethyl iodide above except that reflux temperatures range from 38°–78° C. and reflux times are of the order of 90–100 hours.

A tertiary phosphine prepared in the above examples can be stirred with a 3% hydrogen peroxide-water solution to produce the corresponding phosphine oxides which are effective as detergents or as foam stabilizers.

The foregoing description has been presented describing certain operable and preferred embodiments of this invention. Other variations will be apparent to those skilled in the art.

What is claimed is:

1. A process for preparing tertiary phosphines, said process comprising the following steps:
   (a) reacting a long chain primary phosphine having the formula $RPH_2$ wherein R is an aliphatic radical containing from 10 to 18 carbon atoms, with an alkylating agent having the formula R'X wherein R' is a lower alkyl radical containing from 1 to 4 carbon atoms and X is a halide selected from the group consisting of Cl, Br and I, in an alcohol reaction solvent having the formula R'OH wherein R' is defined as above, within a temperature range of from about 30° C. to about 130° C. and for a period of time ranging from about 10 minutes to about 100 hours, the time and temperature being sufficient to form trialiphatic phosphonium salt but insufficient to cause more than minimal dissociation of trialiphatic phosphonium salt and further alkylation to tetra-aliphatic phosphonium salt; said reaction being carried out in the presence of from 1 to 4 equivalents of added hydrogen chloride, based on the long chain primary phosphine reactant, when X in said alkylating agent is Cl;
   (b) reacting the reaction mixture resulting from step (a) with a strong base;
steps (a) and (b) being conducted in an inert gas atmosphere.

2. The process of claim 1 wherein the alkylating agent is selected from the group consisting of methyl chloride, methyl bromide and ethyl chloride and the reaction of step (a) is carried out in a closed system at a pressure ranging from about atmospheric to about 2000 p.s.i.

3. The process of claim 1 wherein the strong base is sodium hydroxide.

4. The process of claim 1 wherein R' of the alcohol reaction solvent corresponds to the R' of the alkylating agent.

5. A process for preparing long chain aliphatic dimethyl phosphines, said process comprising the following steps:
   (a) reacting a long chain primary phosphine having the formula $RPH_2$ wherein R is an aliphatic radical containing from 10 to 18 carbon atoms, with methyl chloride in methanol reaction solvent; said reaction time and temperature being defined by area A of the drawing; said reaction being carried out in a closed system at a pressure ranging from about atmospheric to about 2000 p.s.i. and in the presence of about 2 equivalents of added hydrogen chloride, based on said long chain primary phosphine;
   (b) completely reacting the reaction mixture from step (a) with sodium hydroxide;
steps (a) and (b) being conducted in an inert gas atmosphere.

6. The process of claim 5 wherein the reaction is carried out at a pressure ranging from about 300 p.s.i. to about 700 p.s.i.

7. The process of claim 5 wherein the reaction of step (a) is carried out at a temperature of 125° C. for a period of time ranging from about .75 to about 1.75 hours.

8. The process of claim 5 wherein from 2 to 4 mole percent, based on said long chain primary phosphine, of iodide ion is added to the reactants in step (a) as a catalyst and the reaction time as defined by area A of the drawing is shortened by a factor of 3.

9. The process of claim 8 wherein the iodide ion is supplied by sodium iodide.

10. The process of claim 5 wherein the long chain primary phosphine is dodecyl phosphine.

11. A process for preparing long chain aliphatic dimethyl phosphines, said process comprising the following steps:
   (a) reacting a long chain primary phosphine having the formula $RPH_2$ wherein R is an aliphatic radical containing from 10 to 18 carbon atoms, with methyl iodide in methanol reaction solvent, said reaction being carried out by refluxing the reactants for from 4.25 to 5.25 hours;
   (b) completely reacting the reaction mixture resulting from step (a) with sodium hydroxide;
steps (a) and (b) being conducted in an inert gas atmosphere.

12. The process of claim 11 wherein the long chain primary phosphine is decyl phosphine.

13. The process of claim 11 wherein the long chain primary phosphine is dodecyl phosphine.

14. A process for preparing long chain aliphatic diethyl phosphines, said process comprising the following steps:
   (a) reacting a long chain primary phosphine having the formula $RPH_2$ wherein R is an aliphatic radical containing from 10 to 18 carbon atoms, with ethyl iodide in ethanol reaction solvent, said reaction being carried out by refluxing the reactants for from 45 to 50 hours;
   (b) completely reacting the reaction mixture resulting from step (a) with sodium hydroxide;
steps (a) and (b) being conducted in an inert gas atmosphere.

15. The process of claim 14 wherein the long chain primary phosphine is dodecyl phosphine.

16. A process for preparing long chain aliphatic dibutyl phosphines, said process comprising the following steps:
(a) reacting a long chain primary phosphine having the formula $RPH_2$ wherein R is an aliphatic radical containing from 10 to 18 carbon atoms, with butyl iodide in butanol reaction solvent, said reaction being carried out at 70° to 75° C. for a period of time ranging from 50 to 75 hours.
(b) completely reacting the reaction mixture resulting from step (a) with sodium hydroxide; steps (a) and (b) being conducted in an inert gas atmosphere.

17. The process of claim 16 wherein the long chain primary phosphine is dodecyl phosphine.

References Cited

Hofman: Chem. Berichte, vol. 6 (1873), pp. 292 to 301, QD1D4.

TOBIAS E. LEVOW, *Primary Examiner.*

W. F. W. BELLAMY, *Assistant Examiner.*